United States Patent
Tanioka et al.

(10) Patent No.: US 8,582,413 B2
(45) Date of Patent: Nov. 12, 2013

(54) OPTICAL PICKUP AND OPTICAL DISK APPARATUS

(71) Applicants: Chikara Tanioka, Yokohama (JP); Kazuo Watabe, Yokohama (JP); Hideaki Okano, Yokohama (JP); Akihito Ogawa, Fujisawa (JP); Takashi Usui, Saitama (JP); Kazuaki Doi, Kawasaki (JP)

(72) Inventors: Chikara Tanioka, Yokohama (JP); Kazuo Watabe, Yokohama (JP); Hideaki Okano, Yokohama (JP); Akihito Ogawa, Fujisawa (JP); Takashi Usui, Saitama (JP); Kazuaki Doi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/709,787

(22) Filed: Dec. 10, 2012

(65) Prior Publication Data

US 2013/0094341 A1 Apr. 18, 2013

Related U.S. Application Data

(63) Continuation of application No. PCT/JP2010/070872, filed on Nov. 24, 2010.

(51) Int. Cl.
*G11B 7/00* (2006.01)
(52) U.S. Cl.
USPC .................................................. 369/112.03
(58) Field of Classification Search
USPC ............ 369/112.1, 112.01, 112.02, 112.03, 369/44.23, 44.24, 112.15, 112.23
See application file for complete search history.

(56) References Cited

U.S. PATENT DOCUMENTS

| | | | |
|---|---|---|---|
| 6,172,957 B1 | 1/2001 | Ogasawara | |
| 6,317,276 B1 | 11/2001 | Braat | |
| 7,423,700 B2 * | 9/2008 | Kim et al. | 349/2 |
| 7,773,468 B2 * | 8/2010 | Yamasaki et al. | 369/44.23 |
| 2004/0190400 A1 * | 9/2004 | Wada et al. | 369/44.11 |
| 2005/0219988 A1 | 10/2005 | Atarashi et al. | |
| 2006/0239170 A1 * | 10/2006 | Hashimoto | 369/112.03 |
| 2008/0055602 A1 * | 3/2008 | Tanabe et al. | 356/445 |
| 2009/0213706 A1 * | 8/2009 | Hotta et al. | 369/44.32 |
| 2010/0027405 A1 * | 2/2010 | Nagatomi et al. | 369/112.23 |

FOREIGN PATENT DOCUMENTS

| | | |
|---|---|---|
| JP | 10-269611 | 10/1998 |
| JP | 2000-090470 A | 3/2000 |
| JP | 2002-533746 A | 10/2002 |
| JP | 2005-293775 A | 10/2005 |
| JP | 2010-097664 A | 4/2010 |

OTHER PUBLICATIONS

International Search Report issued Feb. 15, 2011 in PCT/JP2010/070872 filed Nov. 24, 2010 (with English Translation).
Written Opinion issued Feb. 15, 2011 in PCT/JP2010/070872 filed Nov. 24, 2010.

* cited by examiner

*Primary Examiner* — Nabil Hindi
(74) *Attorney, Agent, or Firm* — Oblon, Spivak, McClelland, Maier & Neustadt, L.L.P.

(57) ABSTRACT

According to one embodiment, an optical pickup configured to record and to reproduce on a layer of a disk, including, a light source configured to emit a laser beam, an objective lens including a variable use magnification and configured to focus the laser beam on the layer, a collimator lens configured to change the magnification of the objective lens by moving along an optical axis direction, and a liquid crystal module configured to generate spherical aberration to cancel a coma aberration which may occur because an object point and an image point of the objective lens at the use magnification do not exist on an optical axis of the objective lens.

4 Claims, 8 Drawing Sheets

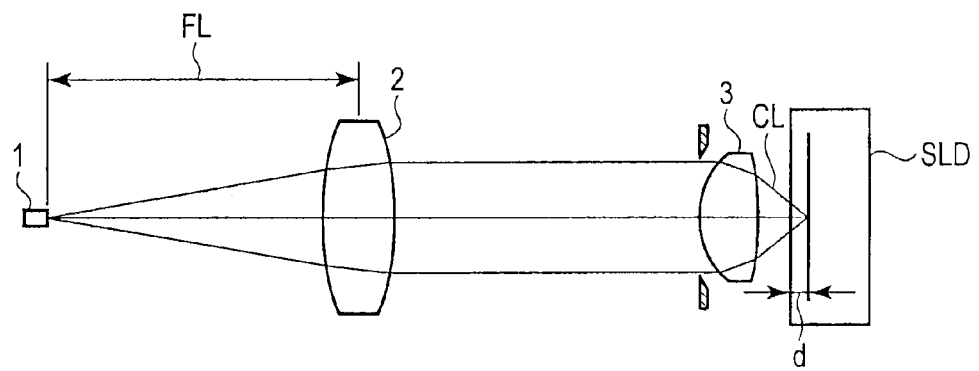
F I G. 1
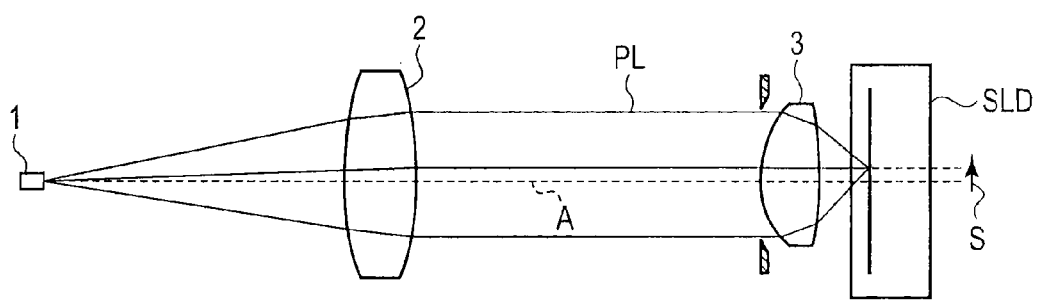
F I G. 2

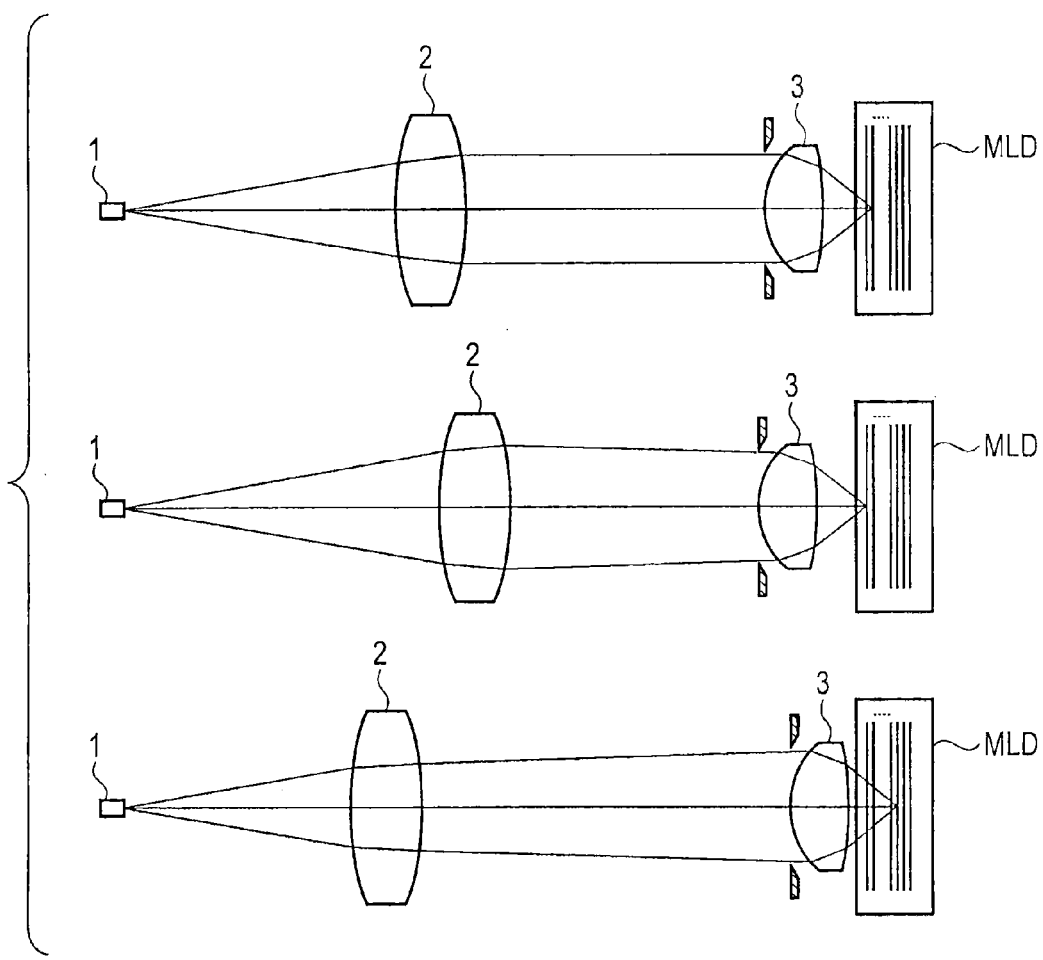
F I G. 7

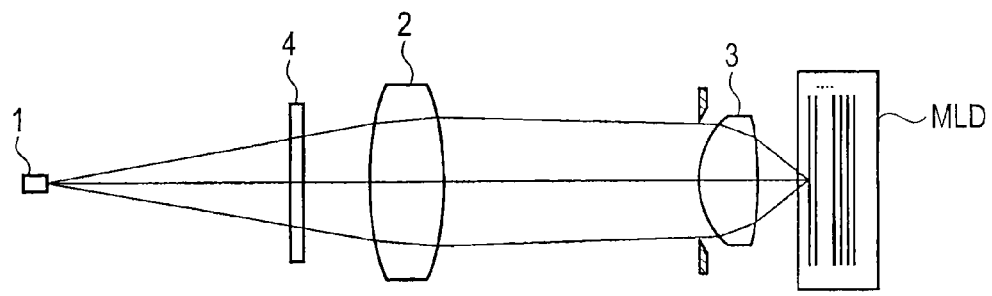
F I G. 8
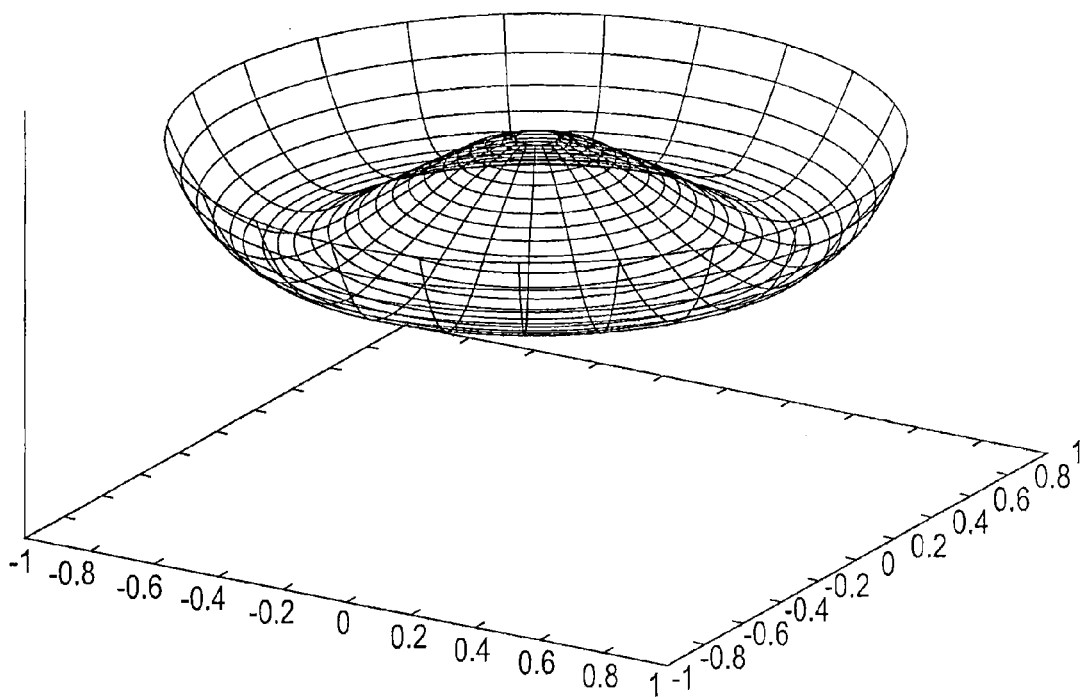
F I G. 9

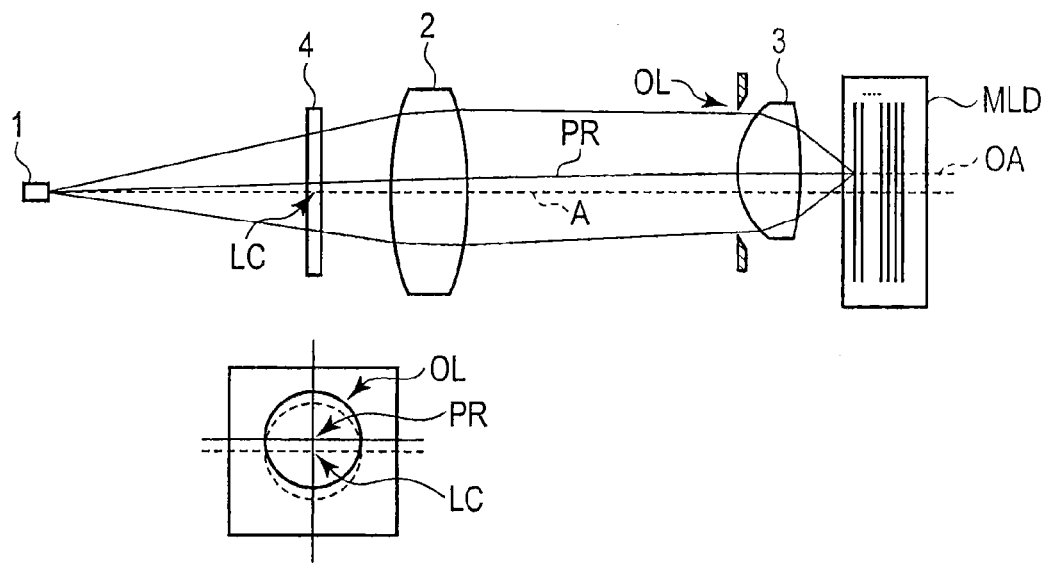
F I G. 10

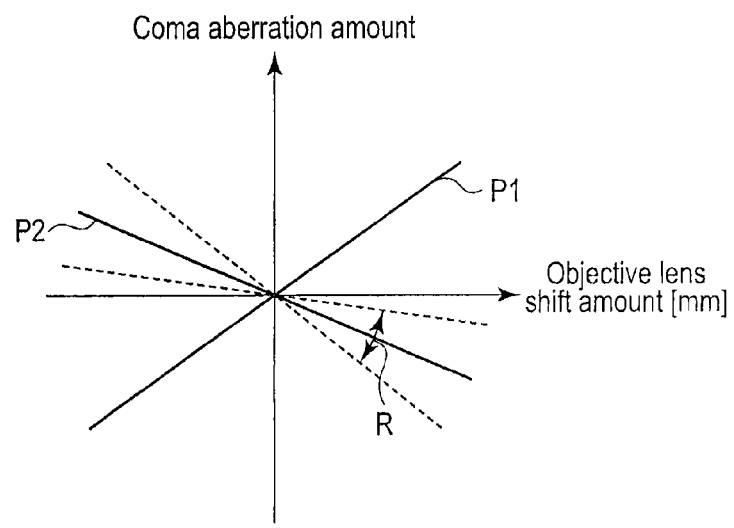
F I G. 11
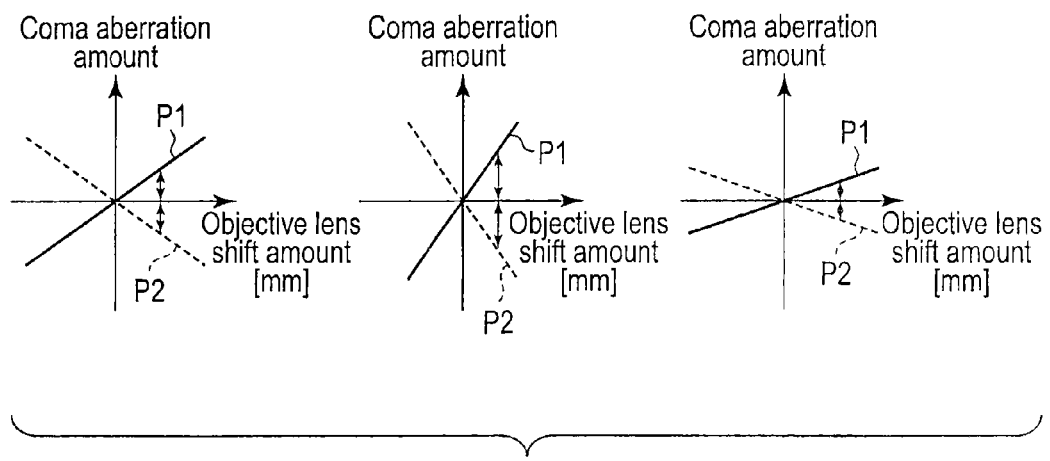
F I G. 12

OPTICAL PICKUP AND OPTICAL DISK APPARATUS

CROSS-REFERENCE TO RELATED APPLICATIONS

This application is a Continuation Application of PCT Application No. PCT/JP2010/070872, filed Nov. 24, 2010, the entire contents of which are incorporated herein by reference.

FIELD

Embodiments described herein relate generally to an optical pickup and optical disk apparatus.

BACKGROUND

In an optical disk system, an objective lens generally focuses a laser beam emitted from a semiconductor laser onto an optical disk. Since information is spirally recorded on the optical disk, the laser beam scanning the information undergoes modulation. When recording information, the laser beam intensity is modulated along a spiral recording track formed on the optical disk. Since the optical disk is decentered, the position of the above-described spiral structure changes with respect to an optical pickup. To follow this change, the objective lens of the optical pickup is held by an actuator, and the actuator is shifted radial direction of relative to the disk. This allows the laser beam to keep scanning the spiral structure.

When the objective lens is shifted as described above, an object point for the objective lens comes off the optical axis of the objective lens. Coma generally occurs for a light beam from an off-axis object point like this. Since coma adversely affects the recording/reproduction performance, it is necessary to remove coma as much as possible. In a conventional optical disk system including a single layer or several layers, coma occurring during lens shift is removed by designing an objective lens so as to satisfy the sine condition.

One method of increasing the capacity of an optical disk system is to increase the number of layers. This is so because a large volume of information can be held on a single disk when many recording/reproduction layers are formed on the disk. A super multilayer optical disk system like this has technical problems that are not posed in the conventional optical disk system including a single layer or several layers. One problem is an objective lens shift characteristic.

To implement a super multilayer optical disk system, the ability to suppress coma occurring when an objective lens is shifted is desirable.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary diagram showing an example of an optical pickup optical system for performing recording and reproduction on a single-layer disk according to an embodiment;

FIG. 2 is an exemplary diagram showing an example of a state in which an objective lens shift occurs in the optical pickup optical system according to an embodiment;

FIG. 7 is an exemplary diagram showing an example of an optical pickup for performing recording and reproduction on a super multilayer disk according to an embodiment;

FIG. 8 is an exemplary diagram showing an example of a super multilayer optical pickup including a liquid crystal device according to an embodiment;

FIG. 9 is an exemplary diagram showing an example of a phase difference corresponding to third-order spherical aberration according to an embodiment;

FIG. 10 is an exemplary diagram showing an example of explaining the occurrence of coma during objective lens shift according to an embodiment;

FIG. 11 is an exemplary diagram showing an example of relationship between an objective lens shift and coma aberration according to an embodiment;

FIG. 12 is an exemplary diagram showing an example of explaining correction for coma aberration in each layer according to an embodiment.

DETAILED DESCRIPTION

Various embodiments will be described hereinafter with reference to the accompanying drawings. In general, according to one embodiment, an optical pickup configured to record and configured to reproduce on an optical disk with a plurality of layers, comprising: an objective lens including a variable use magnification and configured to focus the laser beam on one of the plurality of layers; a collimator lens configured to change the use magnification of the objective lens by moving along an optical axis direction; and a liquid crystal module configured to generate, for each of the plurality of layers, spherical aberration for canceling out coma aberration which may occur because an object point and an image point of the objective lens at the use magnification do not exist on an optical axis of the objective lens.

Embodiments will now be described hereinafter in detail with reference to the accompanying drawings.

FIG. 1 is a view showing an optical pickup optical system for performing recording and reproduction on a single-layer disk. A semiconductor laser 1 is set in a position spaced apart by about a focal length FL of a collimator lens 2. The collimator lens 2 converts a laser beam emitted from the semiconductor laser 1 into parallel light PL. An objective lens 3 converts the parallel light PL into converged light CL, and focuses the converged light CL on a recording/reproduction layer of a single-layer disk SLD.

Spherical aberration generally occurs when the converged light CL is transmitted through a parallel plate such as an optical disk (in this example, the single-layer disk SLD). The amount of spherical aberration changes in accordance with a disk thickness d. Since aberration adversely affects the recording/reproduction performance of an optical disk, spherical aberration must be prevented. The objective lens 3 is so designed as to generate opposite spherical aberration that cancels out the above-mentioned spherical aberration. Accordingly, the spherical aberration of the whole optical pickup becomes zero.

FIG. 2 is a view showing a state in which an objective lens shift occurs in the optical pickup optical system shown in FIG. 1. The semiconductor laser 1 is positioned on an optical axis A, which is represented by a long dotted line, of the collimator lens 2, and spaced apart by the focal length from the collimator lens 2. Therefore, light transmitted through the collimator lens 2 is the same parallel light PL as that shown in FIG. 1. No aberration occurs in the objective lens 3 because the parallel light PL perpendicularly enters the objective lens 3 in the same manner as when there is no lens shift as shown in FIG. 1.

When using the single-layer disk SLD as described above, the system is designed such that parallel light perpendicularly enters the objective lens 3. Consequently, no aberration occurs in the objective lens 3 even when there is a lens shift.

Figure 3:
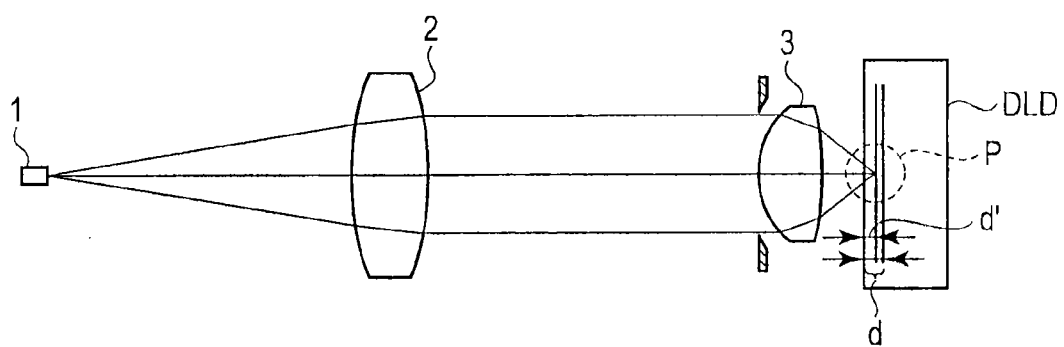
FIG. 3 is an exemplary diagram showing an example of an optical pickup for performing recording and reproduction on a double-layer disk according to an embodiment.

FIG. 3 is a view showing an optical pickup for performing recording and reproduction on a double-layer disk. A double-layer disk DLD shown in FIG. 3 includes two layers having different disk thicknesses d and d'. Assume that light is focused on the layer having the disk thickness d' as shown in FIG. 3 by using the same objective lens 3 as that shown in FIG. 1. Since the objective lens 3 is so designed as to cancel out spherical aberration generated by the disk thickness d, spherical aberration generated by the disk thickness d' cannot be completely canceled out. As a consequence, spherical aberration remains in the optical system.

Figure 4:
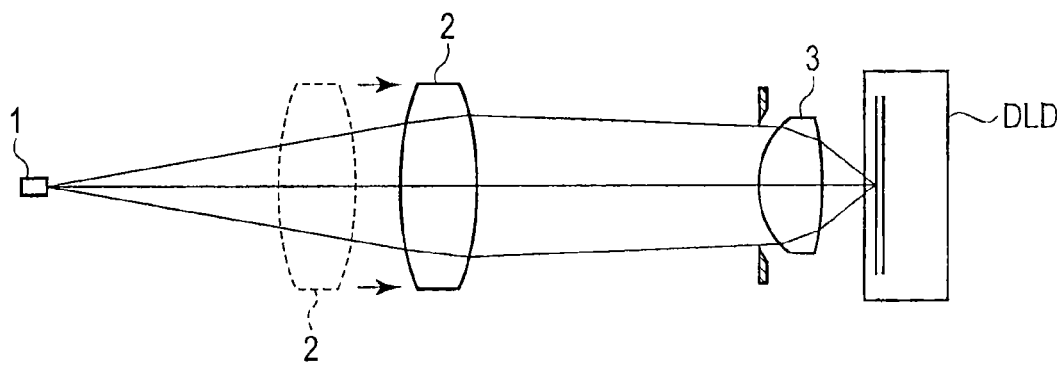
FIG. 4 is an exemplary diagram showing an example of explaining the correction of spherical aberration by a collimator lens according to an embodiment.

As shown in FIG. 4, therefore, the use magnification of the objective lens 3 is changed by moving the collimator lens 2 in the optical axis direction. When the use magnification of the objective lens 3 is changed, spherical aberration generated by the objective lens 3 changes, so spherical aberration generated by the disk thickness d' can be canceled out.

Figure 5:
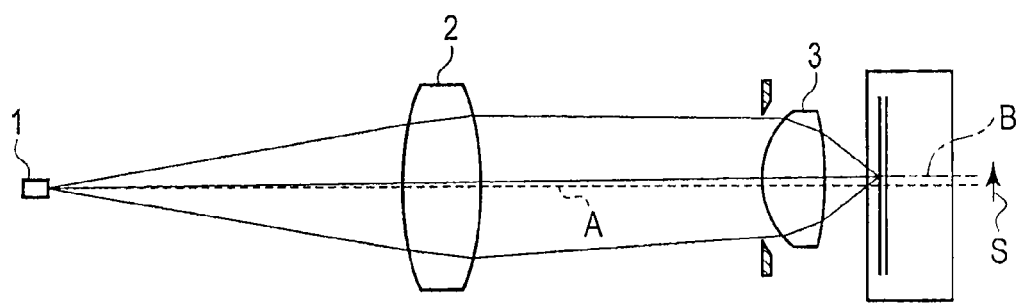
FIG. 5 is an exemplary diagram showing an example of a state in which an objective lens shift occurs in the optical pickup optical system according to an embodiment.

FIG. 5 is a view showing a state in which an objective lens shift occurs in the optical pickup optical system shown in FIG. 4. As in FIG. 4, light transmitted through the collimator lens 2 is converged light focused on the optical axis A of the collimator lens 2. Since an optical axis B of the objective lens 3 is deviated from the optical axis A of the collimator lens 2 by an objective lens shift indicated by an arrow S in FIG. 5, the object point of the objective lens 3 does not exist on the optical axis B of the objective lens 3.

Figure 6:
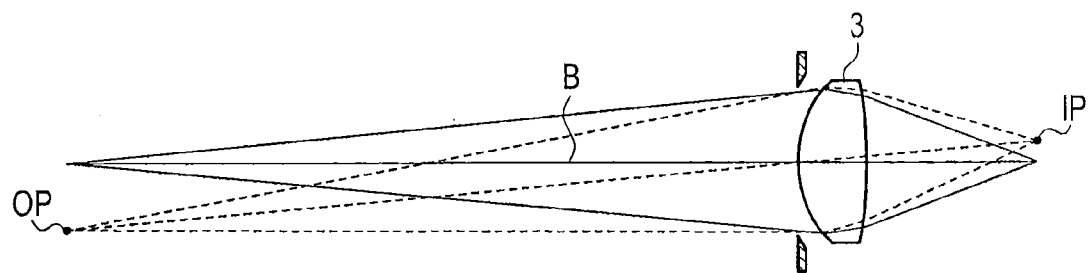
FIG. 6 is an exemplary diagram showing an example of explaining the occurrence of coma aberration according to an embodiment.

As shown in FIG. 6, coma aberration generally occurs when an object point OP (and an image point IP) does not exist on the optical axis B of the objective lens 3. Since aberration adversely affects the recording/reproduction performance of an optical disk, coma aberration must be prevented. Therefore, designing an objective lens 3 (and a system including cover glass having the disk thickness d') so as to satisfy the sine condition will be examined below. When the sine condition is satisfied, no coma aberration probably occurs even if the object point OP (and the image point IP) does not exist on the optical axis B of the objective lens 3.

FIG. 7 is a view showing an optical pickup for performing recording and reproduction on a super multilayer disk. A super multilayer disk MLD includes a number of recording/reproduction layers having different disk thicknesses. Light emitted from the semiconductor laser 1 must be focused on all of these layers. To correct spherical aberration that changes in accordance with the disk thickness, the use magnification of the objective lens 3 is changed by moving the collimator lens 2 on the optical axis, in the same manner as for the above-described double-layer disk.

Unfortunately, this method has a problem: spherical aberration generated when the use magnification of the objective lens 3 is changed does not necessarily completely match spherical aberration generated by the difference between the disk thicknesses. That is, spherical aberration can be expanded by the Zernike polynomial. However, when the use magnification of the objective lens 3 is selected so that third-order spherical aberration as lowest-order spherical aberration on the objective lens side and that on the disk side cancel each other out, other higher-order spherical aberrations on the objective lens side and disk side dot not necessarily cancel each other out. Although this higher-order spherical aberration is small when the difference between the disk thicknesses of layers is small as in a double-layer disk or an optical disk including several layers, higher-order spherical aberration is nonnegligibly large in the super multilayer disk MLD.

Accordingly, the objective lens 3 (and the system including the cover glass) is so designed as to satisfy the Herschel's condition with respect to higher-order spherical aberration. This design prevents the change of higher-order spherical aberration even when third-order spherical aberration is canceled out by changing the use magnification of the objective lens 3 with respect to the disk thickness difference. Note that the Herschel's condition conflicts with the above-described sine condition, so it is impossible to design the objective lens 3 meeting the two conditions. Accordingly, coma generated by an objective lens shift must be suppressed by some method.

As shown in FIG. 8, therefore, a liquid crystal device 4 is installed in the optical system of a super multilayer disk optical pickup according to this embodiment. The liquid crystal device 4 is designed to give a phase difference equivalent to third-order spherical aberration to the wavefront of light transmitted through the liquid crystal device 4.

The phase difference equivalent to third-order spherical aberration is a phase difference symmetrical with respect to the center as shown in a graph of FIG. 9, and the center is positioned on the optical axis of the collimator lens 2. If there is no objective lens shift as shown in FIG. 8, third-order spherical aberration generated by the liquid crystal device 4 can be canceled out simultaneously with third-order spherical aberration generated by the disk thickness, by third-order spherical aberration generated in accordance with that change in use magnification of the objective lens 3, which is based on the movement of the collimator lens 2. That is, even when the liquid crystal device 4 generates a phase difference equivalent to third-order spherical aberration, no spherical aberration remains in the optical pickup optical system.

If an objective lens shift exists as shown in FIG. 10, however, a principal ray PR as a light ray passing through the center of an opening OL deviates from a phase difference center LC of the liquid crystal device 4. That is, the phase difference given by the liquid crystal device 4 is no longer symmetrical with respect to the center of the opening OL through which the principal ray PR passes. This is not third-order spherical aberration but coma aberration having a rotational symmetry of 180°.

On the other hand, the objective lens 3 satisfies the Herschel's condition and does not satisfy the sine condition. Therefore, this coma aberration is more specifically coma aberration that can occur because the object point and image point of the objective lens at the use magnification do not exist on the optical axis of the objective lens.

FIG. 11 is a graph showing the relationship between an objective lens shift and coma aberration. Referring to FIG. 11, a plot P1 is coma aberration generated because the objective lens 3 does not satisfy the sine condition. A plot P2 is coma aberration generated because the phase difference center of the liquid crystal device 4 deviates from the principal ray PR. The latter coma aberration generated by the liquid crystal device 4 can be changed by a voltage to be applied to the liquid crystal device 4. That is, as shown in FIG. 11, the slope of the plot representing come aberration that increases or decreases in accordance with an objective lens shift amount on the abscissa can be changed as indicated by an arrow R.

By using this, it is possible, by properly selecting the voltage to be applied to the liquid crystal device 4, to cancel out coma generated because the objective lens 3 does not satisfy the sine condition by coma generated by the liquid crystal device 4. The slope of plot P1 shown in FIG. 11 representing coma generated because the objective lens 3 does not satisfy the sine condition generally changes from one recording/reproduction layer to another. As shown in FIG. 12, therefore, coma corresponding to each slope can be canceled out by applying an appropriate voltage to the liquid crystal device 4 for each layer.

Figure 13:
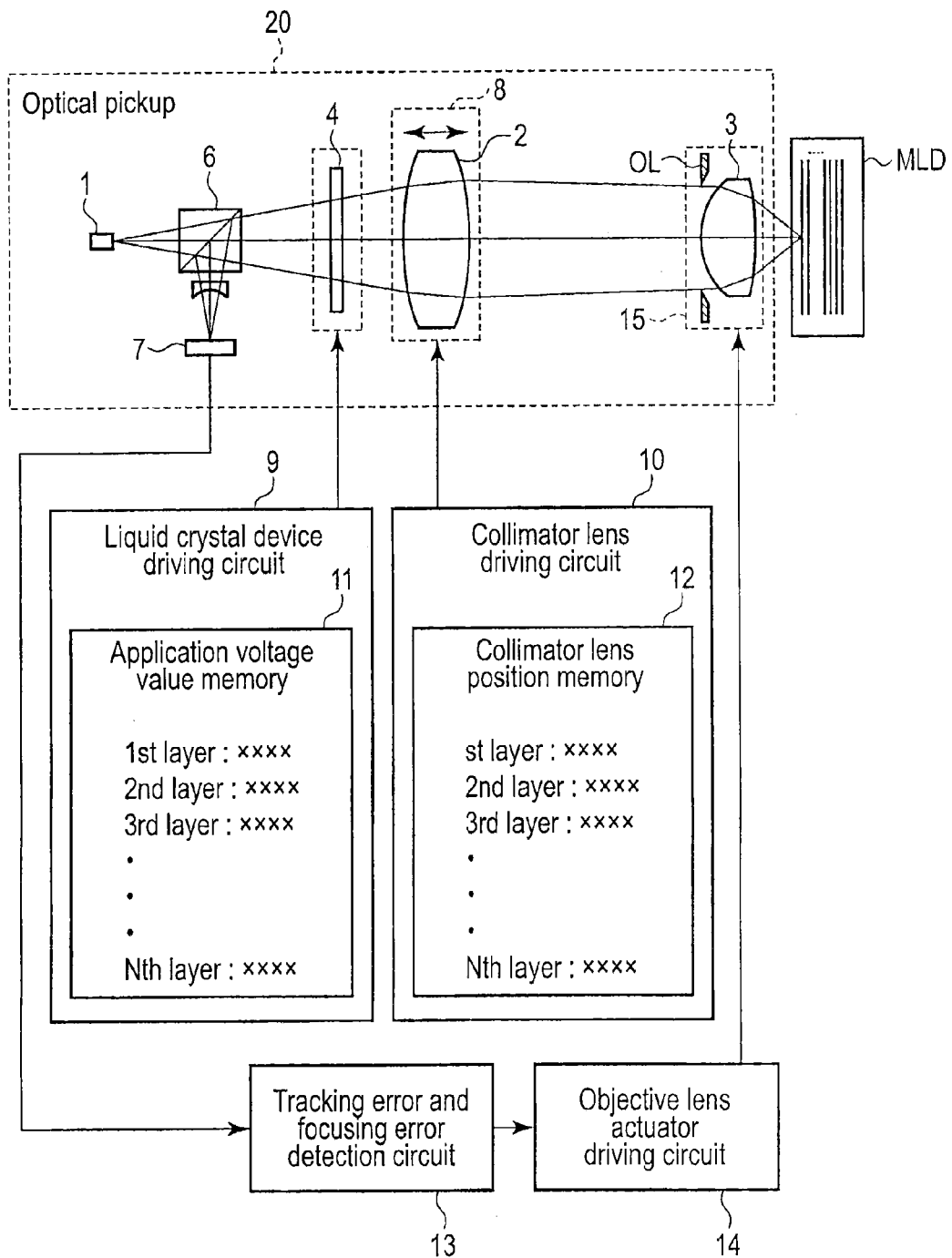
FIG. 13 is an exemplary diagram showing an example of an optical disk apparatus including an optical pickup according to an embodiment.

FIG. 13 is a view showing an optical disk apparatus including the optical pickup according to this embodiment. This apparatus includes an optical pickup 20, liquid crystal driving circuit 9, collimator lens driving circuit 10, tracking error & focusing error detection circuit 13, and objective lens actuator driving circuit 14.

The optical pickup 20 includes a semiconductor laser 1, collimator lens 2, objective lens 3, liquid crystal device 4, beam splitter 6, photodetector 7, collimator lens driving mechanism 8, and objective lens actuator 15, and is set to oppose a super multilayer disk MLD including n recording/reproduction layers.

The objective lens 3 is held by the objective lens actuator 15 so as to be able to scan the spiral structure of a target layer of the super multilayer disk MLD. The collimator lens 2 is held by the collimator lens driving mechanism 8 so as to be movable along the optical axis in order to change the use magnification of the objective lens 3. The liquid crystal device 4 is connected to the liquid crystal device driving circuit 9 so as to be able to generate a phase difference equivalent to arbitrary third-order spherical aberration.

An optical signal modulated by the super multilayer disk MLD is detected by the photodetector 7 through the beam splitter 6, and converted into a voltage signal. Based on this voltage signal, the circuit 13 detects a tracking error and focusing error. In accordance with these error amounts, the objective lens actuator driving circuit 14 transmits a driving signal to the objective lens actuator 15. Even when the spiral structure of the super multilayer disk MLD has moved radially relative to the disk because of decentering or the like, the feedback loop as described above enables the objective lens 3 to similarly shift radially relative to the disk and follow the spiral structure.

The liquid crystal device driving circuit 9 includes a memory 11 for storing application voltage values optimum for the individual layers of the super multilayer disk MLD. When performing recording or reproduction to each layer, the liquid crystal device driving circuit 9 reads an application voltage value corresponding to the layer from the memory 11, and applies the read voltage to the liquid crystal device 4.

The collimator lens driving circuit 10 includes a memory 12 for storing collimator lens positions optimum for the individual layers of the super multilayer disk MLD. When performing recording or reproduction to each layer, the collimator lens driving circuit 10 reads a position corresponding to the layer from the memory 12, and transmits the read position to the collimator lens driving mechanism 8. The collimator lens driving mechanism 8 moves the collimator lens 2 to the corresponding position.

The application voltage value of the liquid crystal device 4 which is optimum for each layer and the position of the collimator lens 2 which is optimum for each layer can be determined by the following procedures.

[Procedure 1]: A predetermined application voltage is applied to the liquid crystal device 4.

[Procedure 2]: The collimator lens 2 is moved so as to cancel out spherical aberration.

[Procedure 3]: With the objective lens 3 being shifted, whether coma falls within the tolerance range is determined.

[Procedure 4]: If it is determined in procedure 3 that coma falls outside the tolerance range, the process is reexecuted from the [procedure 1].

[Procedure 5]: The process is started from the [procedure 1] for the next layer.

An optimum application voltage value and optimum collimator lens position are respectively determined in the [procedure 1] and [procedure 2] described above. Although spherical aberration in the [procedure 2] and coma aberration in [procedure 3] can also be measured by using an interferometer, it is also possible to simply use a signal evaluation index such as reproduction signal amplitude or jitter instead.

As described above, this embodiment can suppress coma occurring during an objective lens shift when implementing a super multilayer optical disk system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical pickup configured to record and configured to reproduce on an optical disk with a plurality of layers, comprising:
   a light source configured to emit a laser beam;
   an objective lens including a variable use magnification and configured to focus the laser beam on one of the plurality of layers;
   a collimator lens configured to change the use magnification of the objective lens by moving along an optical axis direction; and
   a liquid crystal module configured to generate, for each of the plurality of layers, spherical aberration for canceling out coma aberration which may occur because an object point and an image point of the objective lens at the use magnification do not exist on an optical axis of the objective lens.

2. The optical pickup of claim 1, wherein the objective lens satisfies a Herschel's condition for higher-order spherical aberration.

3. The optical pickup of claim 1, wherein the liquid crystal module gives a phase difference equivalent to third-order spherical aberration to a wavefront of the laser beam.

4. An optical disk apparatus comprising:
   an optical pickup configured to record and configured to reproduce on an optical disk with a plurality of layers, the optical pickup includes,
   a light source configured to emit a laser beam, an objective lens including a variable use magnification and configured to focus the laser beam on one of the plurality of layers, a collimator lens configured to change the use magnification of the objective lens by moving along an optical axis direction, and a liquid crystal module configured to generate, for each of the plurality of layers, spherical aberration for canceling out coma aberration which may occur because an object point and an image point of the objective lens at the use magnification do not exist on an optical axis of the objective lens;

a memory configured to store of a plurality of application voltages for generating the spherical aberration of the plurality of layers; and a driving circuit configured to read a corresponding application voltage from the memory and apply the read application voltage to the liquid crystal module, if performing recording or reproduction to one of the plurality of layers.

* * * * *